(12) United States Patent
Shingler

(10) Patent No.: US 7,926,417 B2
(45) Date of Patent: Apr. 19, 2011

(54) OUTDOOR COOKING SYSTEM

(75) Inventor: Robert A. Shingler, Beaverton, OR (US)

(73) Assignee: Evo, Inc., Beaverton, OR (US)

( * ) Notice: Subject to any disclaimer, the term of this patent is extended or adjusted under 35 U.S.C. 154(b) by 1128 days.

(21) Appl. No.: 11/080,129

(22) Filed: Mar. 14, 2005

(65) Prior Publication Data

US 2005/0199136 A1 Sep. 15, 2005

Related U.S. Application Data

(60) Provisional application No. 60/553,475, filed on Mar. 15, 2004.

(51) Int. Cl.
*A47J 37/00* (2006.01)

(52) U.S. Cl. ............. 99/340; 99/339; 99/449; 126/41 R; 126/40; 126/50

(58) Field of Classification Search .................... 99/340, 99/425, 445–447, 339, 449; 126/41 R, 40, 126/50, 51
See application file for complete search history.

(56) References Cited

U.S. PATENT DOCUMENTS

| 3,172,402 | A |   | 3/1965  | Valiela |
| 3,176,676 | A |   | 4/1965  | Caldwell |
| 3,606,612 | A |   | 9/1971  | Reid, Jr. |
| 3,824,984 | A |   | 7/1974  | Swanson et al. |
| 3,843,313 | A |   | 10/1974 | Helgeson |
| 4,062,341 | A |   | 12/1977 | Panzarella |
| 4,108,142 | A |   | 8/1978  | Barson et al. |
| 4,313,416 | A |   | 2/1982  | Lau |
| 4,342,259 | A |   | 8/1982  | Lee |
| 4,353,347 | A |   | 10/1982 | Seed |
| 4,452,224 | A |   | 6/1984  | Misumida |
| 4,481,408 | A |   | 11/1984 | Scheufler |
| 4,553,524 | A |   | 11/1985 | Wheat et al. |
| 4,830,206 | A | * | 5/1989  | Fisher ........................... 215/209 |
| 4,889,103 | A |   | 12/1989 | Fraioli |
| 4,957,039 | A |   | 9/1990  | Reyes |
| 5,072,718 | A |   | 12/1991 | Seal |
| 5,127,824 | A |   | 7/1992  | Barker |
| 5,158,067 | A |   | 10/1992 | Dutro et al. |
| 5,413,087 | A |   | 5/1995  | Jean |
| 5,579,703 | A | * | 12/1996 | King ............................. 108/186 |
| 5,941,229 | A | * | 8/1999  | Schlosser et al. ............ 126/41 R |

(Continued)

*Primary Examiner* — Reginald L Alexander
(74) *Attorney, Agent, or Firm* — Alleman Hall McCoy Russell & Tuttle LLP

(57) ABSTRACT

A cooking apparatus is disclosed, wherein the cooking apparatus is configured to be converted between an installed configuration in which the cooking apparatus is connected to a complementary support structure and a portable configuration in which the cooking apparatus is not attached to the complementary support structure. The cooking apparatus includes a cooking surface, at least one burner configured to heat the cooking surface, a body configured to support the cooking surface above the burner, and a connecting portion disposed on the body, wherein the connecting portion includes at least one connector configured to be connected to a complementary connector on the complementary support structure, and wherein the connecting portion is also configured to support the cooking apparatus on a surface other than the complementary support structure when the cooking apparatus is used in the portable configuration.

35 Claims, 10 Drawing Sheets

U.S. PATENT DOCUMENTS

| | | |
|---|---|---|
| 6,105,487 A | 8/2000 | Nash et al. |
| 6,189,530 B1 | 2/2001 | Shingler |
| 6,223,738 B1 | 5/2001 | Wu |
| 6,223,739 B1 | 5/2001 | Pai |
| 6,276,356 B1 | 8/2001 | Ragland et al. |
| 6,488,022 B2 | 12/2002 | Shingler |
| 6,606,987 B2 * | 8/2003 | DeMars .................... 126/38 |
| 6,626,090 B2 | 9/2003 | McLemore et al. |
| 2001/0015332 A1 * | 8/2001 | Flynn ..................... 206/523 |
| 2002/0020405 A1 * | 2/2002 | Coleman et al. ........... 126/41 R |
| 2004/0194774 A1 * | 10/2004 | Nugent et al. ............ 126/41 R |

* cited by examiner

US 7,926,417 B2

OUTDOOR COOKING SYSTEM

CROSS-REFERENCE TO RELATED APPLICATIONS

This application claims priority to U.S. Provisional Patent Application Ser. No. 60/553,475, filed Mar. 15, 2004, the disclosure of which is incorporated by reference herein.

BACKGROUND

Many types of cooking systems are known. For example, some cooking systems are designed for outdoor use. One type of outdoor cooking system may be generally referred to as a patio cooker or grill. Patio cookers tend to be large, sturdy cookers with relatively high thermal outputs, and may be designed to cook multiple items at one time. Many patio cookers are intended to be portable in some sense, as they may be mounted on rollers or wheels to allow the cooker to be moved. However, due to the size and weight of many of these cookers, the practical portability of the cookers may be limited to the immediate area of the cooker. Examples of patio cookers are disclosed in U.S. Pat. Nos. 6,189,530 and 6,488,022, the disclosures of which are hereby incorporated by reference.

Another type of outdoor cooking system may be generally referred to as a portable cooker. Portable cookers tend to be smaller and more lightweight than patio cookers, and thus may be more suitable for camping, tailgating, recreational vehicle use and other such uses in which the cooker must be loaded into, transported by, and unloaded from, a user's vehicle. Portable cookers may be made either for tabletop use, or may have foldout legs to support the cooker above the ground. In either case, portable cookers tend to be less sturdy than patio cookers, and generally offer less thermal output, making them less desirable to use as a home backyard or patio cooker. For this reason, many households end up purchasing separate patio and portable cookers.

SUMMARY

One embodiment provides a cooking apparatus configured to be converted between an installed configuration in which the cooking apparatus is connected to a complementary support structure and a portable configuration in which the cooking apparatus is not attached to the complementary support structure, the cooking apparatus including a cooking surface, at least one burner configured to heat the cooking surface, a body configured to support the cooking surface above the burner, and a connecting portion disposed on the body, wherein the connecting portion includes at least one connector configured to be connected to a complementary connector on the complementary support structure, and wherein the connecting portion is also configured to support the cooking apparatus on a surface other than the complementary support structure when the cooking apparatus is used in the portable configuration.

Another embodiment provides a cooking system configured to be converted between a portable configuration and an installed configuration, the cooking system including a cooking apparatus having a cooking surface, at least one burner configured to heat the cooking surface, a body configured to support the cooking surface above the burner, and a connecting portion associated with a lower portion of the body, the connecting portion having a connector and including at least one foot; and the cooking system also including a free-standing support structure removably coupled to the cooking system, wherein the support structure is configured to support the cooking apparatus above an underlying surface, and wherein the support structure includes a complementary connector configured to be connected to the connector of the cooking apparatus to removably connect the cooking apparatus to the support structure.

Yet another embodiment provides a cooking apparatus including a substantially continuous cooking surface, a burner configured to heat the cooking surface, a body supporting the cooking surface over the burner, and a drip pan removably coupled with the body and extending beyond an edge of the cooking surface, wherein the drip pan is configured to receive drippings that fall from the edge of the cooking surface.

DETAILED DESCRIPTION OF THE DEPICTED EMBODIMENTS

Figure 1:
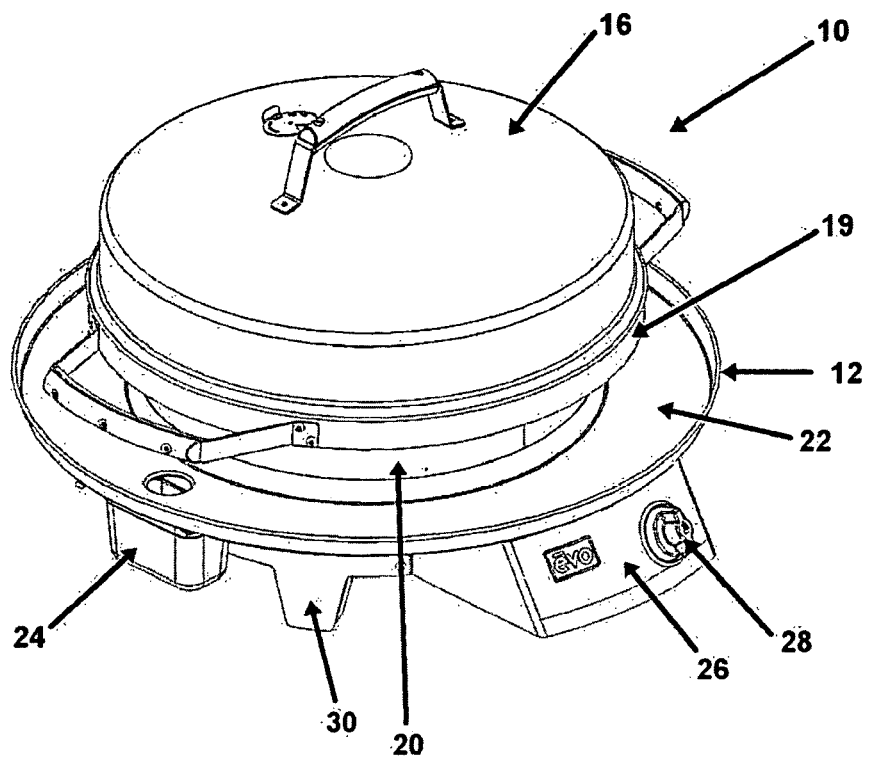
FIG. 1 is a partially exploded front isometric view of a first embodiment of an outdoor cooking system including an exemplary cooking apparatus and an exemplary support structure.
Figure 1:
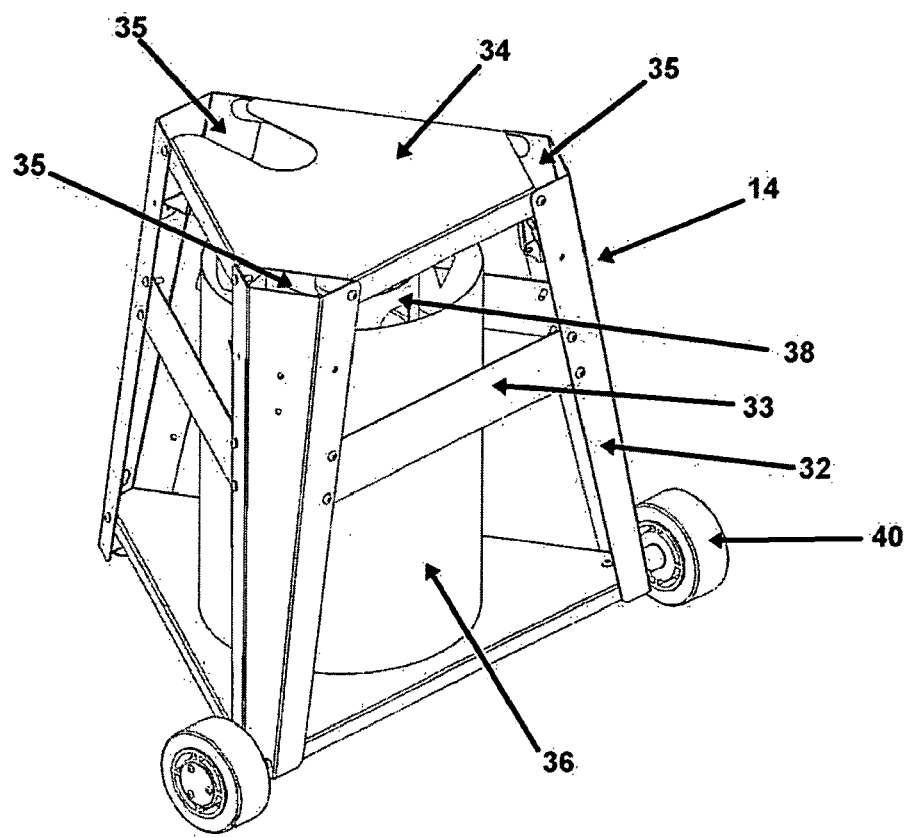
Figure 2:
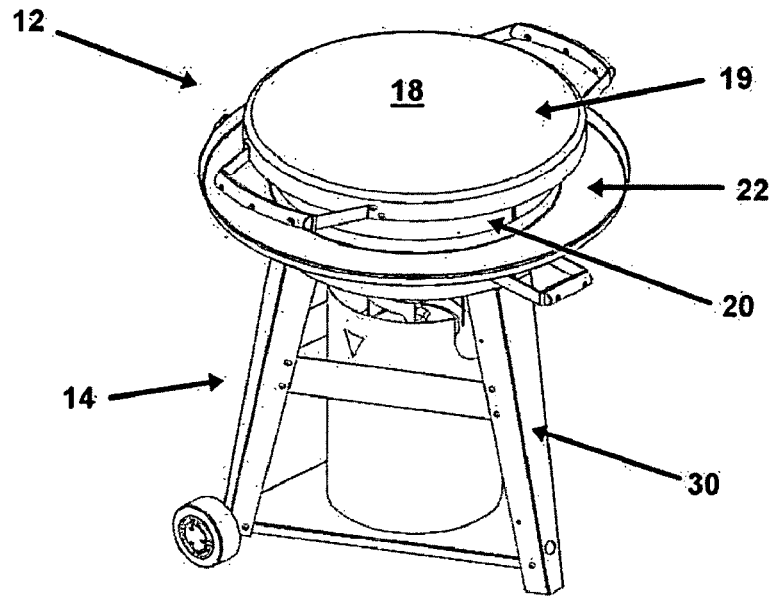
FIG. 2 is a rear isometric view of the embodiment of FIG. 1.
Figure 3:
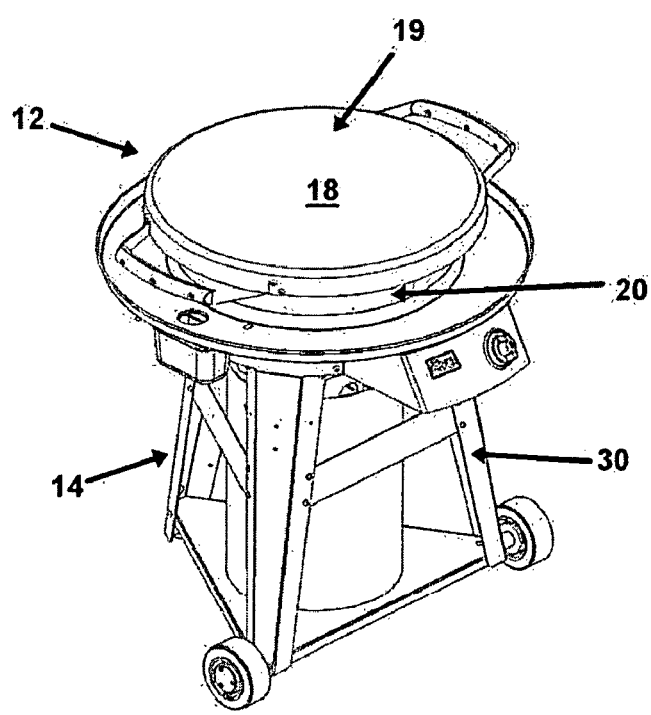
FIG. 3 is a front isometric view of the embodiment of FIG. 1.
Figure 4:
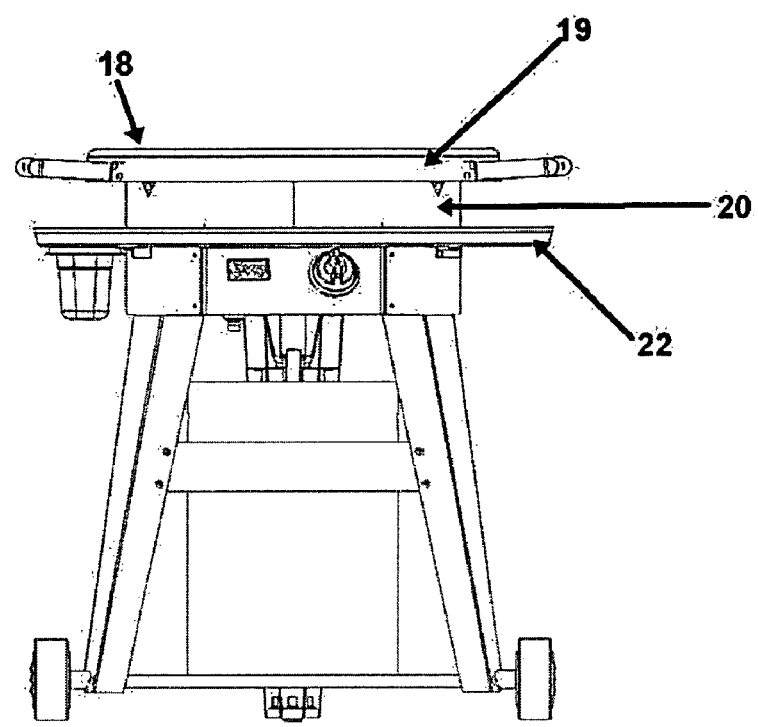
FIG. 4 is a front view of the embodiment of FIG. 1.
Figure 5:
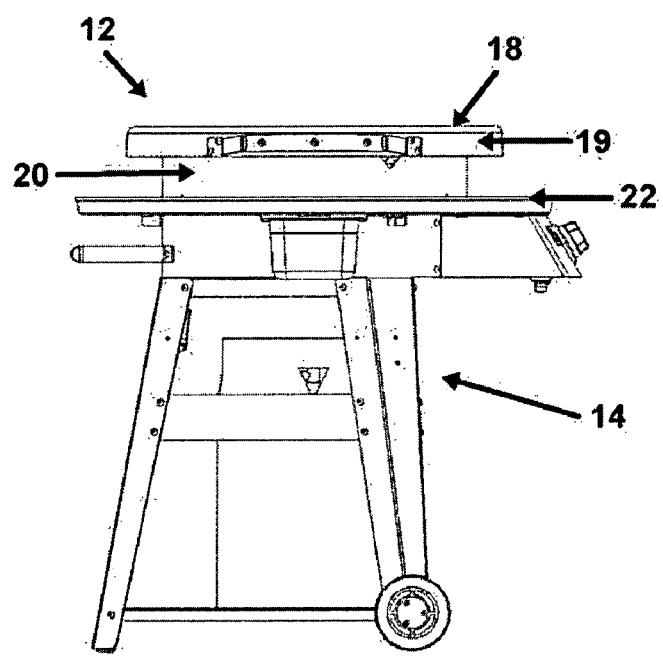
FIG. 5 is a side view of the embodiment of FIG. 1.
Figure 6:
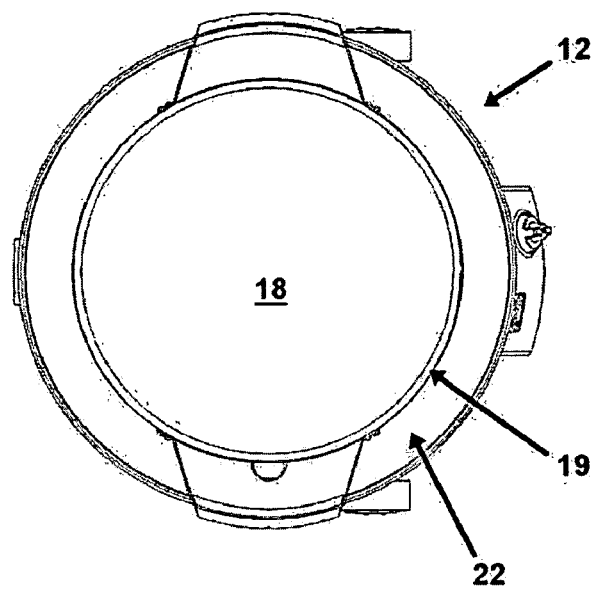
FIG. 6 is a top view of the embodiment of FIG. 1.
Figure 7:
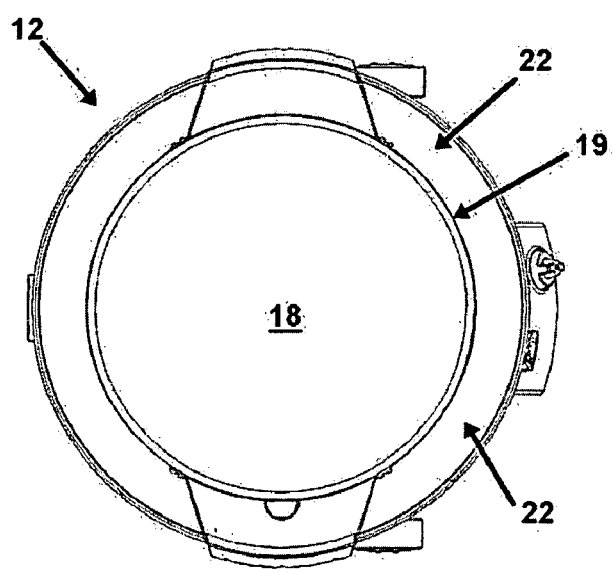
FIG. 7 is a top view of the cooking apparatus of the embodiment of FIG. 1, removed from the support structure.
Figure 8:
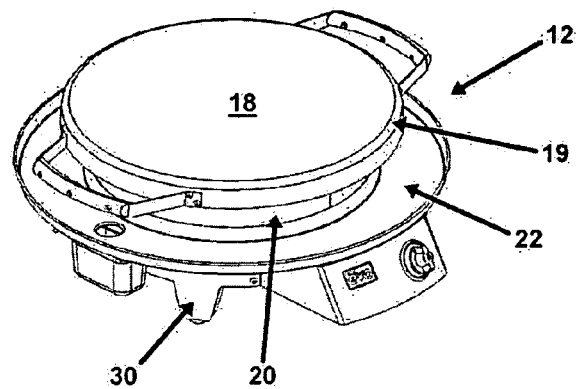
FIG. 8 is an isometric view of the cooking apparatus of the embodiment of FIG. 1.

FIG. 1 shows a first exemplary embodiment of an outdoor cooking system according to the present disclosure, generally at 10. Outdoor cooking system 10 includes a cooking apparatus 12 that is removably attachable to a support structure 14. When cooking apparatus 12 is attached to support structure 14, outdoor cooking system 10 is configured to have the sturdy, solid feel of a patio-style cooker. When detached from support structure 14, cooking apparatus 12 is configured to be placed on any desired surface and used as a portable cooker while still offering the performance and versatility characteristics of a patio-style cooker. While support structure 14 is shown herein as a stand for supporting cooking apparatus 12 in a patio cooker-like configuration, it will be appreciated that support structure 14 may have any other suitable configuration for either indoor or outdoor use. Examples include, but are not limited to, indoor or outdoor cooking bars or islands, carts, etc. The term "installed configuration" may be used herein to describe the configuration in which cooking apparatus 12 is connected to support structure 14, and the term "portable configuration" may be used to describe cooking apparatus 12 detached from support structure 14.

Cooking apparatus 12 includes a removable cover 16 for covering a cooking surface 18 of a heat transfer plate 19. FIGS. 2-6 show various views of outdoor cooking system 10 with the cover removed. Cooking surface 18 of the depicted embodiment has a generally round shape, and has a generally flat profile from edge to edge. However, cooking surface 18 may have any other suitable shape and profile. For example, cooking surface 18 may have a rectangular or other polygonal shape, an oval or other curvilinear shape, or any combination of the two. Furthermore, while the depicted cooking surface 18 is shown as being substantially continuous and unbroken, cooking surface 18 may also have one or openings.

Cooking apparatus 12 also includes a body having a cooking surface support 20 that supports the cooking surface, a drip pan 22 disposed around the body, and a drip collection receptacle 24 coupled to the drip pan to collect drippings. A control panel 26 is mounted to cooking apparatus 12, and includes a fuel valve control 28 for controlling an amount of fuel fed to the burner or burners within cooking surface support 20.

Cooking apparatus 12 also includes a plurality of feet 30 that extend lower than the other parts of cooking apparatus 12. Feet 30 are configured to support cooking apparatus 12 above a surface, such as a tabletop or the ground, when the cooking apparatus is used separately from support structure 14. This allows sufficient air to flow into the interior of the cooking apparatus for reacting with fuel from the burners, provides a sturdy stance for cooking apparatus 12, and helps to protect the underlying surface from heat from the burners. Feet 30 may also be configured to be connected to support structure 14 to couple cooking apparatus 12 to support structure 14, as described in more detail below. Cooking apparatus 12 is depicted as having three feet 30, but it will be understood that cooking apparatus 12 may have either more or fewer feet, or may also have any other suitable base, such as a pedestal-style base.

Support structure 14 includes a plurality of legs to support cooking apparatus 12 at a desired height above the ground or other underlying surface. The depicted support structure 14 includes a leg 32 for each foot 30 on cooking apparatus 12. However, support structure 14 may include either more or fewer legs, or even no legs (for example, in a pedestal-style or cabinet-style design).

Legs 32 are connected by cross-braces 33 and are capped by an optional upper surface 34. Upper surface 34 includes openings 35 into which feet 30 on cooking apparatus 12 fit when cooking apparatus 12 is connected to support structure 14. In the depicted embodiment, openings 35 are positioned over the tops of legs 32 such that feet 30 extend into legs 32 when cooking apparatus 12 is connected to support structure 14.

A fuel bottle receptacle 36 may be provided between legs 32 of support structure 14 for holding a fuel bottle 38 in place within support structure 14. Receptacle 36 may be configured to hide a fuel bottle 38 substantially from view to thereby provide a more pleasing appearance to cooking system 10. Wheels 40 may be attached to support structure 14 to aid a user in moving cooking system 10.

Cooking system 10 may be made from any suitable material or materials. In one embodiment, cooking system 10 is made substantially of stainless steel, with the exception of a few small items, such as fittings along a fuel delivery line for delivering fuel from fuel bottle 38 to the burner or burners, wheels, knobs for the fuel control valve, etc. Where cooking system 10 is made of stainless steel, any suitable alloy and gauge of steel may be used. For example, in one embodiment, legs 32 of support structure 14 are made of fourteen-gauge steel.

Cooking surface 18 may have any suitable size. Where outdoor cooking system 10 is intended for personal use, cooking surface 18 may have a diameter, for example, in the range of 12-30 inches. Likewise, where outdoor cooking system 10 is intended for commercial use, cooking surface 18 may have a somewhat larger diameter, for example, in the range of 30-40 inches. It will be appreciated that these ranges are merely exemplary, and that cooking surface 18 may have any other suitable diameter, either above or below these ranges.

Cooking system 10 may also have any suitable height. For example, when cooking apparatus 12 is connected to support structure 14, the overall height of cooking system 10 may be in the range of 31-37 inches, and more typically in the range of 34-35 inches. Alternatively, cooking system 10 may have a height outside of these ranges. Other possible dimensions for cooking system are listed below in Table I. Again, it will be appreciated that these dimensions are merely exemplary, and not intended to be limiting in any sense.

TABLE I

| Dimension | Distance (inches) |
| --- | --- |
| Wheel-to-wheel width of stand | 30–32 |
| Horizontal distance from wheel axle to back leg of stand | 22–25 |
| Handle-to-handle width of cooking surface | 32–34 |
| Height of cooking apparatus detached from support structure | 10–15 |
| Height of support structure detached from cooking apparatus | 22–27 |

In some embodiments, cooking surface 18 is coated with a high-temperature ceramic coating. Examples of a suitable ceramic coating include, but are not limited to, enamel coatings such as black porcelain enamel coatings. Such a porcelain enamel coating may be applied by a powder coating and high-fire furnace process, or by any other suitable process, and may have an exemplary thickness of 0.3-0.6 thousandths of an inch. The use of a ceramic coating may offer advantages over the use of a steel cooking surface in some circumstances, as the ceramic coating is not susceptible to rust or degradation by oxidation. Furthermore, such a ceramic coating is extremely resistant to damage caused by cooking utensils and other ordinary wear and tear, as well as other types of damage.

Figure 9:
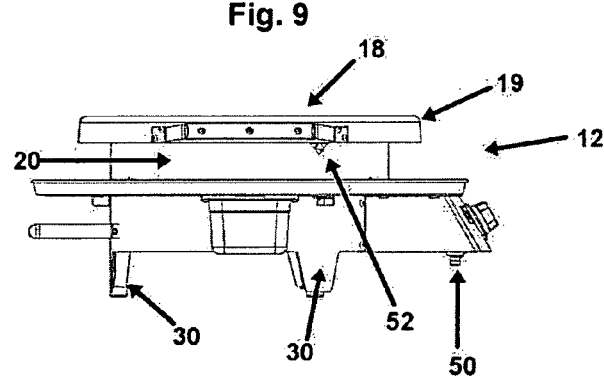
FIG. 9 is a side view of the cooking apparatus of the embodiment of FIG. 1.
Figure 10:
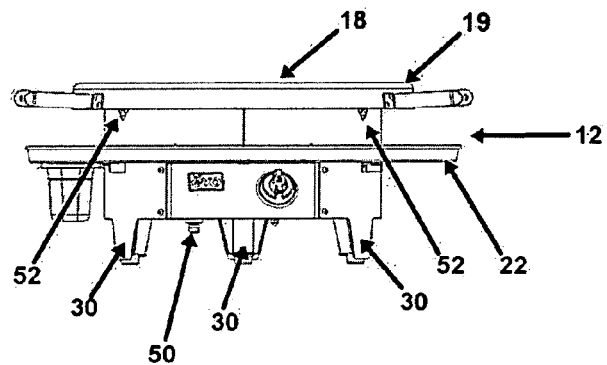
FIG. 10 is a front view of the cooking apparatus of the embodiment of FIG. 1.

FIGS. 7-10 show cooking apparatus 12 detached from support structure 14. In particular, FIGS. 9 and 10 illustrate feet 30 holding cooking apparatus 12 above a surface, thereby allowing sufficient air flow into the cooking apparatus for the efficient combustion of fuel. These figures also illustrate one exemplary positioning of a fitting 50 for attaching a fuel line. Furthermore, FIGS. 9 and 10 illustrate one possible placement and arrangement of flame viewing ports 52.

Figure 11:
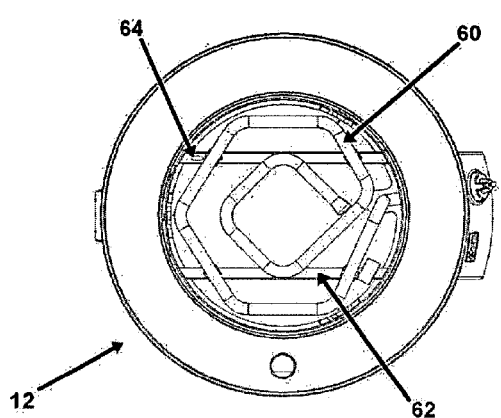
FIG. 11 is a top view of the cooking apparatus of the embodiment of FIG. 1, with the cooking surface removed.
Figure 12:
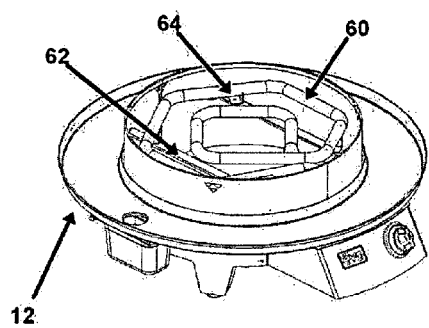
FIG. 12 is an isometric view of the cooking apparatus of the embodiment of FIG. 1, with the cooking surface removed.
Figure 13:
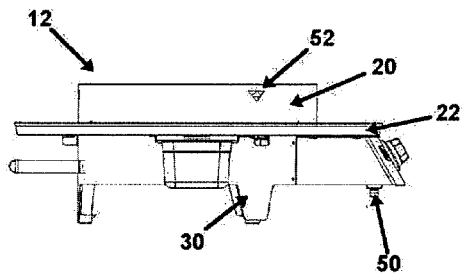
FIG. 13 is a side view of the cooking apparatus of the embodiment of FIG. 1, with the cooking surface removed.
Figure 14:
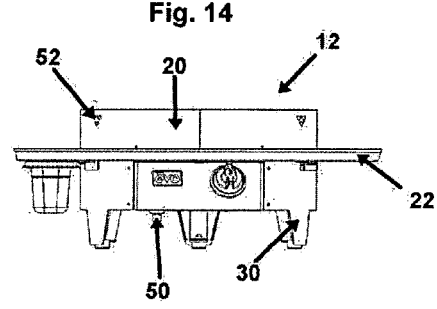
FIG. 14 is a front view of the cooking apparatus of the embodiment of FIG. 1, with the cooking surface removed.

FIGS. 11-14 depict cooking apparatus 12 with cooking surface 18 removed. In particular, FIGS. 11 and 12 show a burner 60 disposed within cooking surface support 20. Burner 60 is formed from a length of tubing, and includes holes (not shown) formed along its length to permit fuel to escape the tubing, mix with air and burn. Burner 60 is arranged in a generally spiral configuration formed of generally concentric circles. In the depicted embodiment, the generally concentric circles are formed from generally straight segments of burner separated by angular segments. The configuration of burner 60 may also be thought of as a plurality of generally concentric rings each having a polygonal shape. This single burner arrangement may distribute heat more evenly across the bottom of cooking surface 18 than other single burner arrangements. Alternatively, burner 60 may take the form of concentric circular rings, or any other suitable shape. Furthermore, while the depicted embodiment has a single burner, it will be appreciated that outdoor cooking system 10 may alternatively have two or more burners. Where outdoor cooking system 10 has multiple burners, the burners may be controlled by a single gas flow valve, or may each have an independent gas flow valve.

Burner 60 may be configured to have any desired thermal output. In one embodiment, burner 60 has a thermal output of approximately 28,500 BTU's, and is capable of heating cooking surface 18 to any desired temperature in the range between 250 to 690 degrees Fahrenheit. In other embodiments, burner 60 may have thermal outputs and temperature ranges other than these exemplary outputs and ranges.

One or more burner supports 62 may be positioned within cooking surface support 20 to support burner 60 at a desired level below cooking surface 18. Burner supports 62 may include burner positioning brackets 64 to hold burner 60 in a desired position on supports 62.

Figure 15:
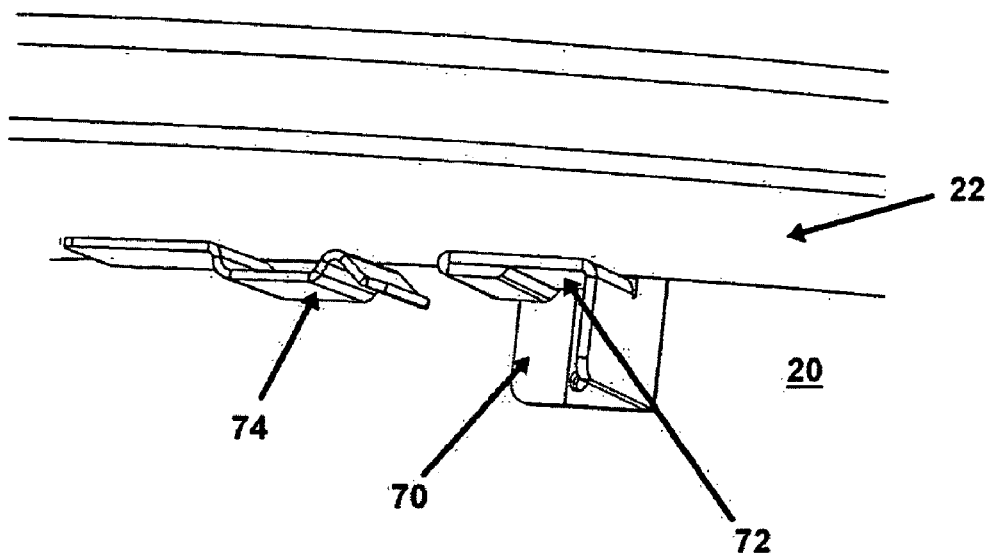
FIG. 15 is a view of exemplary embodiments of a drip pan detent clip and drip pan support tab, showing the detent clip disengaged from the support tab.
Figure 16:
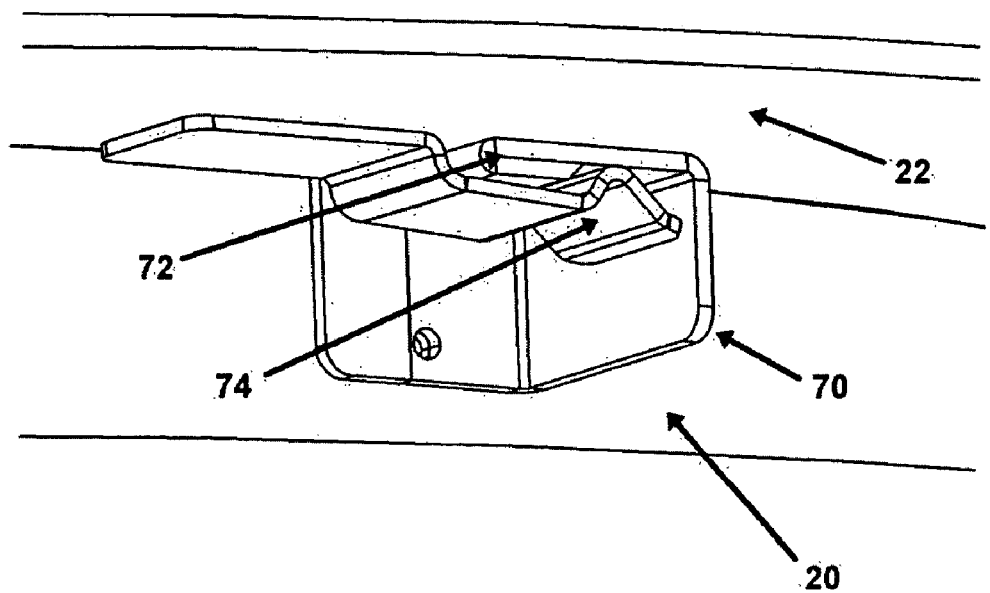
FIG. 16 is a view of the drip pan detent clip and drip pan support bracket of FIG. 15, showing the detent clip engaged with the support bracket.

Drip pan 22 may be permanently attached to cooking surface support 20, or may be removably attached. FIGS. 15 and 16 show one exemplary mechanism for removably attaching drip pan 22 to cooking surface support 20. Cooking surface support 20 includes a plurality of drip pan support brackets 70 attached to an exterior surface of the cooking surface support. Drip pan support brackets 70 include a horizontally extending tab 72 that supports drip pan 22. Tab 72 also provides a connection point for a drip pan detent clip 74 that is disposed on a lower surface of the drip pan. Drip pan 22 may be attached or detached from cooking surface support 20 simply by twisting drip pan 22 in an appropriate direction to attach (FIG. 16) or detach (FIG. 15) detent clip 74 from tab 72. Alternatively, any other suitable mechanism may be used for removably attaching drip pan 22 to cooking surface support 20.

Detent clip 74 may be attached to drip pan 22 in any suitable manner. For example, detent clip 74 may be attached to drip pan 22 via a weld, a rivet, or a bolt. Welding detent clip 74 to drip pan 22 may offer the advantage that no holes are formed through drip pan 22, and thus may help to prevent drippings from leaking through bolt or rivet holes.

Figure 17:
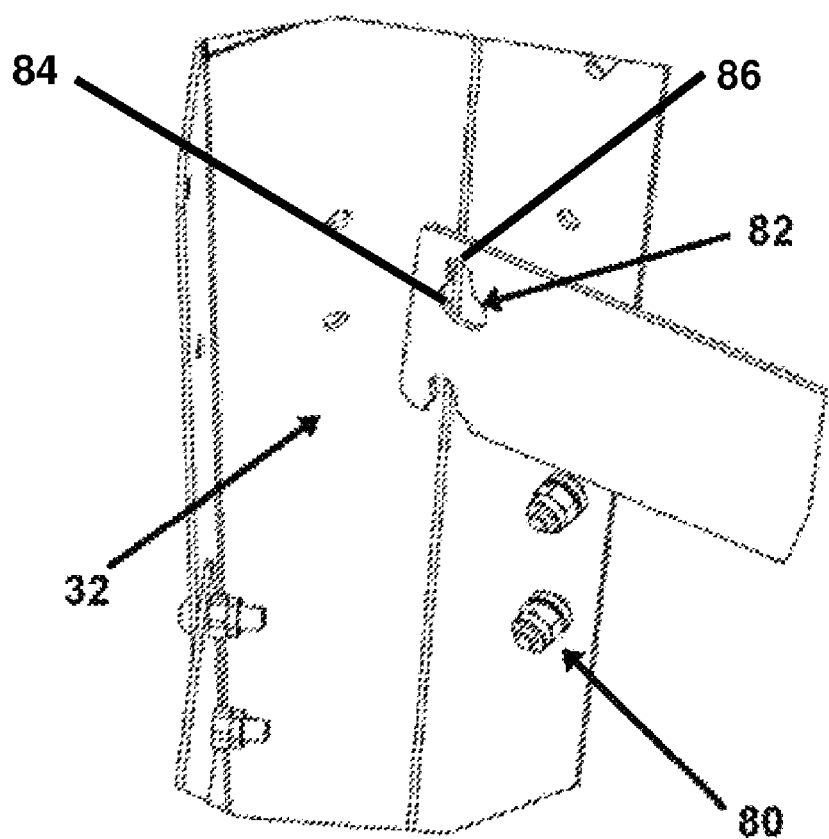
FIG. 17 is a view of an exemplary embodiment of a removable cross-brace on the support structure of the embodiment of FIG. 1.

Support structure 14 may include any suitable mechanism for allowing the removal of fuel bottle 38 from the interior of support structure 14. This helps to enable removal of the fuel bottle for the transportation of the fuel bottle for refueling and for use with cooking apparatus 12 in the portable configuration. In one exemplary embodiment, cooking apparatus support 34 of support structure 14 may be removable to allow fuel bottle 38 to be removed from the top of support structure 14. Alternatively, one or more of the cross-braces 33 on support structure 14 may be removably attached to one or more legs 32. FIG. 17 shows one exemplary method of removably attaching a cross-brace 33 to one of legs 32. Leg 32 includes a standoff feature 80, such as a bolt head or other keeper that is attached to a bolt extending from leg 32 and that is spaced from the surface of leg 32. Cross-brace 33 includes a keyhole connector 82 having a wider portion 84 configured to accept insertion of the standoff feature, and a narrower portion 86 to accommodate the bolt, but not the standoff feature. Cross-brace 33 may be connected to leg 32 by inserting the standoff feature through wider portion 84 of keyhole connector 82, and then sliding cross-brace downwardly to lock narrower portion 86 of keyhole connector 82 behind the standoff feature. Likewise, cross-brace 33 may be detached from leg 32 to allow access to fuel bottle 38 simply by reversing these operations.

Cross-brace 33 may be removably attached to leg 32 at one of its ends, or may be removably attached to legs 32 at each of its ends. Where cross-brace 33 is removably attached at one end, the other end may be attached to its corresponding leg 32 with a pivotal connection that allows cross brace 33 to be pivoted out of the way of the fuel bottle. Where cross-brace 33 has removable connections to legs 32 at both of its ends, it can be completely removed from support structure 14 to allow access to the fuel bottle.

Figure 18:
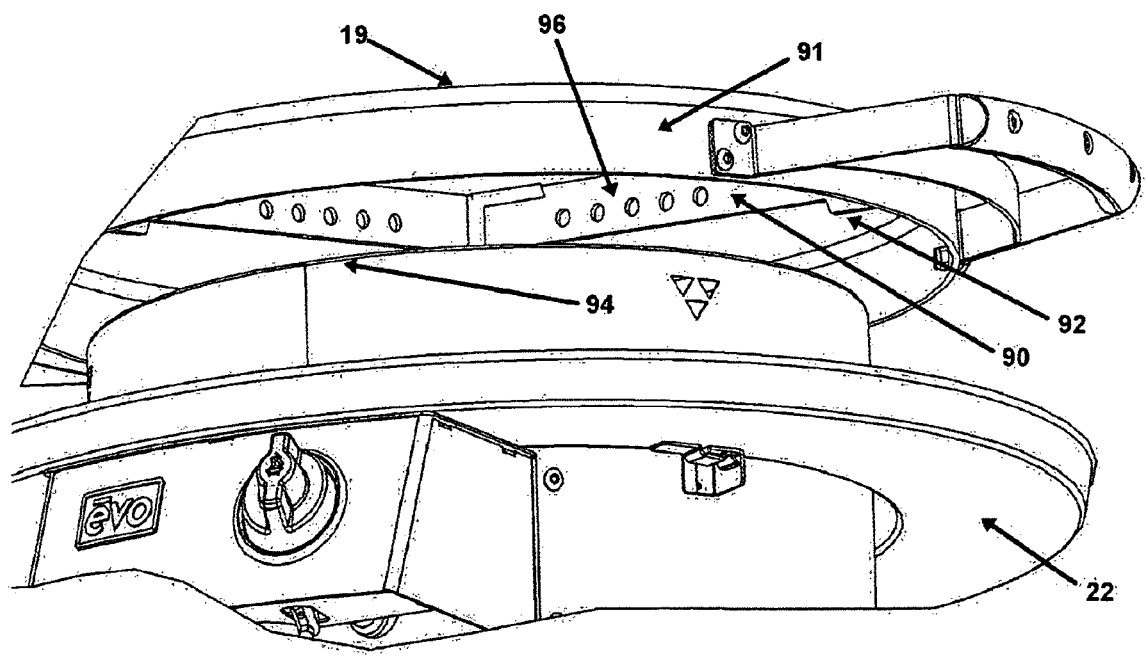
FIG. 18 is a view of an exemplary embodiment of a cooking surface support.

The bottom surface of heat transfer plate 19 may be held spaced above the top of cooking surface support 20 to allow exhaust gases to escape. One suitable mechanism for holding heat transfer plate 19 spaced above the top of cooking surface support 20 is shown in FIG. 18. Heat transfer plate 19 includes an outer rim 91 that extends beyond cooking surface support 20. A heat transfer plate support 90 is attached to the lower surface of heat transfer plate 19, which holds heat transfer place 19 above the top of cooking surface support 20 and allows exhaust gases to flow through the space between heat transfer plate 19 and cooking surface support 20.

Heat transfer plate support 90 may also help position heat transfer plate 19 on cooking surface support 20. In the depicted embodiment, heat transfer plate support 90 includes a tab 92 that defines a corner along the lower edge of heat transfer plate support 92. The corner defined by tab 92 is configured to accommodate the upper edge 94 of cooking surface support 20. The use of a plurality of heat transfer plate supports 90 helps ensures that heat transfer plate 90 remains correctly positioned over cooking surface support 20. It will be appreciated that the heat transfer plate supports 90 depicted herein are merely exemplary and that any other suitable mechanism may be used to allow exhaust gases to escape from underneath heat transfer plate 19.

FIG. 18 also shows an optional cooking surface brace 96. Where the cooking surface includes a ceramic coating, the ceramic coating process may require subjecting the cooking surface to temperatures on the order of 1800 degrees Celsius or higher for 20 minutes or more. Such processing conditions may cause an unsupported cooking surface to warp. In particular, cooking surfaces having a smooth continuous shape with a diameter of greater than 12 inches, or cooking surfaces having surface areas greater than 120 square inches (of any shape) may be particularly susceptible to warping caused by the elevated temperatures of ceramic coating processes. Therefore, the underside of the cooking surface may include one or more braces 96 for supporting the shape of the cooking surface during the ceramic coating process. Braces 96 may extend partially, substantially, or fully across the underside of the cooking surface, and may have any suitable configuration for preventing deformation.

Figure 19:
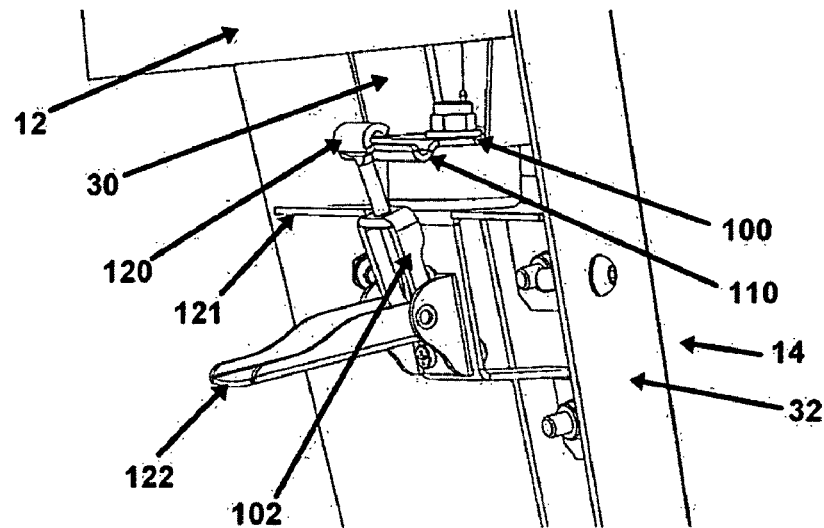
FIG. 19 is a view of an exemplary embodiment of a connector on the cooking apparatus and a complementary connector on the support structure, showing the connector disengaged from the complementary connector.
Figure 20:
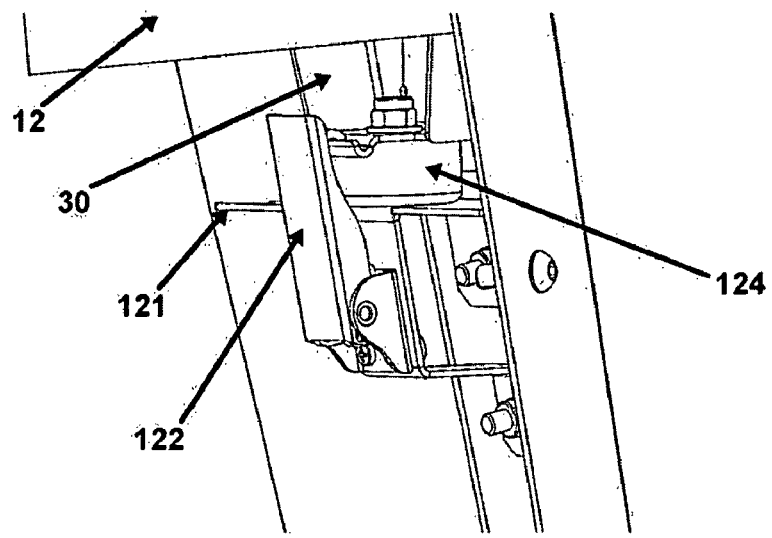
FIG. 20 is a view of the connector and complementary connector of FIG. 19, showing the connector engaged with the complementary connector.

Support structure 14 may include a mechanism for securing cooking apparatus 12 to support structure 14 when cooking apparatus 12 is positioned on support structure 14. For example, cooking apparatus 12 may include a connecting portion configured to be connected to a complementary connecting portion on support structure 14. The term "connecting portion" refers to portions of cooking apparatus 12 and support structure 14 that are associated with the connection of cooking apparatus 12 to support structure 14. One suitable mechanism is shown in FIGS. 19-20. In this embodiment, the connecting portion of cooking apparatus includes a connector 100 formed on each foot 30 of cooking apparatus 12, wherein each connector 100 is configured to be connected to a complementary connector 102 attached to an inside surface of each leg 32 on support structure 14. Connecting each foot 30 of cooking apparatus 12 to each leg 32 of support structure 14 helps to ensure that cooking apparatus 12 and support structure 14 act as, and have the feel of, a single unit when connected together to give outdoor cooking system 10 the sturdy, high-quality feel of an upper end patio cooker system when cooking apparatus 12 and support structure 14 are connected together.

Connector 100 is depicted as a lip 110 formed on an inwardly extending portion of a lower part of foot 30. Complementary connector 102 is depicted as including a hook-shaped member 120 configured to hook over lip 110, a support surface 121 on which foot 30 rests, and a lever 122 configured to pull the hook-shaped member 120 into engagement with lip 110. Foot 30 may also include a spring 124 configured to be compressed when lever 122 is pushed to an engaged position (i.e. when hook-shaped member 122 is pulled into engagement with lip 110). This may provide for a firmer, more controllable connection of cooking apparatus 12 to support structure 14. Any suitable type of spring may be used as spring 124. In the depicted embodiment, spring 124 takes the form of an elastomeric member coupled to the foot 30. Spring 124 may also serve as a pad to protect surfaces on which cooking apparatus 12 is placed during use.

The placement of connector 100 on foot 30 and complementary connector 102 on leg 32 allows both the connector and complementary connector to be easily accessed, yet also allows each to be hidden from view. This may improve the overall appearance of cooking system 10 to a user. Connectors 100 and complementary connectors 102 may be included on each foot and leg, respectively, if desired, or may be included on only a subset of feet and legs. Alternatively, cooking apparatus 12 and support structure 14 may include any suitable type of connecting portion and complementary connecting portion, respectively. For example, cooking apparatus 12 may include a pedestal-style base having a generally flat lower surface with one or more openings formed therein, and support structure 14 may include one or more features configured to extend into the openings in the base of cooking apparatus 12. Likewise, cooking apparatus 12 may include connectors disposed on other locations than feet 30 (including, but not limited to, other locations along a lower portion of cooking surface support 20), and support structure 14 may include appropriate complementary connectors.

Although the present disclosure includes specific embodiments of cooking systems, specific embodiments are not to be considered in a limiting sense, because numerous variations are possible. The subject matter of the present disclosure includes all novel and nonobvious combinations and subcombinations of the various cooking system elements, features, functions, and/or properties disclosed herein. The description and examples contained herein are not intended to limit the scope of the invention, but are included for illustration purposes only. It is to be understood that other embodiments of the invention can be developed and fall within the spirit and scope of the invention and claims.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A cooking apparatus configured to be converted between an installed configuration in which the cooking apparatus is connected to a complementary support structure and a portable configuration in which the cooking apparatus is not attached to the complementary support structure, the cooking apparatus comprising:
   a cooking surface;
   at least one burner configured to heat the cooking surface;
   a body configured to support the cooking surface above the burner; and
   a connecting portion fixed to the body, the connecting portion including a plurality of feet disposed on and extending below the body, wherein the connecting portion includes at least one connector configured to be connected to a complementary connector on the complementary support structure, the complementary connector including a lever, wherein a biasing member is disposed on a bottom of each foot of the plurality of feet, each biasing member being configured to be compressed in a direction extending along a complementary leg of the support structure when the connector is coupled to the complementary connector by pushing the lever, and wherein the plurality of feet of the connecting portion are configured to support the cooking apparatus above a surface other than the complementary support structure when the cooking apparatus is used in the portable configuration.

2. The cooking apparatus of claim 1, wherein the plurality of feet comprises at least three feet.

3. The cooking apparatus of claim 1, wherein each foot of the plurality of feet includes a connector.

4. The cooking apparatus of claim 3, wherein the connector of each foot is located on an interior surface of the foot.

5. The cooking apparatus of claim 1, wherein the connector includes a lip disposed on the connecting portion.

6. The cooking apparatus of claim 5, wherein the lip is positioned to accept attachment of a hook-shaped complementary connector disposed on the support structure.

7. The cooking apparatus of claim 1, wherein each biasing member includes an elastomeric pad.

8. The cooking apparatus of claim 1, wherein the cooking surface is substantially continuous.

9. The cooking apparatus of claim 8, wherein the cooking surface has a generally round perimeter.

10. The cooking apparatus of claim 1, further comprising a drip pan removably coupled to an outer portion of the body.

11. The cooking apparatus of claim 1, wherein the burner includes an elongate tube arranged in a generally spiral configuration beneath the cooking surface.

12. The cooking apparatus of claim 11, wherein the generally spiral configuration includes generally straight segments linked by angled segments.

13. The cooking apparatus of claim 1, further comprising the support structure connected to the cooking apparatus.

14. The cooking apparatus of claim 1, wherein the support structure is a stand.

15. The cooking apparatus of claim 10, wherein the drip pan includes a connector configured to engage a complementary connector on the body.

16. The cooking apparatus of claim 15, wherein the connector is a clip coupled to a lower surface of the drip pan, and wherein the complementary connector is a tab extending from the body of the cooking apparatus.

17. A cooking system configured to be converted between a portable configuration and an installed configuration, the cooking system comprising:
- a cooking apparatus, the cooking apparatus including a cooking surface, at least one burner configured to heat the cooking surface, a body configured to support the cooking surface above the burner, and a connecting portion forming a lower portion of the body, the connecting portion including a plurality of feet, where the plurality of feet extend outward from the body on an opposite side of the body from the cooking surface, each foot including a lip; and
- a free-standing support structure removably coupled to the cooking system, wherein the support structure is configured to support the cooking apparatus above an underlying surface, and wherein the support structure includes a plurality of complementary hook-shaped connectors, each hook-shaped connector being configured to connect with a corresponding lip of the connecting portion of the cooking apparatus to removably connect the cooking apparatus to the support structure;
- wherein a biasing member is disposed on a bottom of each foot of the plurality of feet, each biasing member being configured to be compressed in a direction extending along a complementary leg of the support structure by operation of a corresponding hook shaped connector when the cooking apparatus is connected to the support structure.

18. The cooking system of claim 17, wherein the support structure is a stand.

19. The cooking system of claim 18, wherein the stand includes a plurality of legs and an upper cooking apparatus support surface coupled to the plurality of legs.

20. The cooking system of claim 19, wherein the cooking apparatus support surface includes at least one opening through which one of the plurality of feet of the cooking apparatus extends.

21. The cooking system of claim 20, wherein the cooking apparatus support surface includes an opening disposed over each leg of the support structure.

22. The cooking system of claim 20, wherein the cooking apparatus support surface includes a plurality of openings through which the plurality of feet of the cooking apparatus extend.

23. The cooking system of claim 19, wherein each complementary connector is disposed on a corresponding leg.

24. The cooking system of claim 23, wherein the stand has as many legs as the cooking apparatus has feet.

25. The cooking system of claim 24, wherein the complementary connectors are located on interior surfaces of the legs of the stand.

26. The cooking system of claim 17, wherein the burner includes an elongate tube arranged in a generally spiral configuration beneath the cooking surface, wherein the generally spiral configuration includes generally straight segments linked by angled segments.

27. The cooking system of claim 17, wherein each biasing member is an elastomeric pad.

28. The cooking system of claim 17, further comprising a drip pan removably coupled to the body, the drip pan including a clip coupled to the lower surface of the drip pan configured to engage a complementary tab extending from the body.

29. The cooking system of claim 28, wherein the clip is a detent clip configured to engage and disengage the complementary tab by spring action of the detent clip.

30. A cooking apparatus, comprising:
- a substantially continuous cooking surface;
- a burner configured to heat the cooking surface;
- a body supporting the cooking surface over the burner; and
- a drip pan removably coupled with the body and extending beyond an edge of the cooking surface, wherein:
  - the drip pan is configured to receive drippings that fall from the edge of the cooking surface,
  - the drip pan substantially surrounds the body and is removable from the body by rotating the drip pan relative to the body, and
  - the drip pan includes a detent clip configured to engage a tab extending from the body of the cooking apparatus by rotating the drip pan in a first direction and to disengage the tab by rotating the drip pan in a second, opposite direction, wherein the detent clip is configured to engage and disengage the tab by spring action of the detent clip.

31. The cooking apparatus of claim 30, wherein the drip pan has an annular shape.

32. The cooking apparatus of claim 30, wherein the body has a generally circular perimeter, and wherein the detent clip is removable from the tab and attachable to the tab by rotating the drip pan relative to the body.

33. The cooking apparatus of claim 30, wherein the burner has an elongate, tubular configuration arranged in a generally spiral configuration beneath the cooking surface.

34. The cooking apparatus of claim 33, wherein the burner includes generally straight segments linked by angled segments along its length.

35. The cooking apparatus of claim 30, wherein the detent clip is fixed to a lower surface of the drip pan.

* * * * *